United States Patent [19]

Shannon et al.

[11] Patent Number: 6,099,791
[45] Date of Patent: Aug. 8, 2000

[54] METHODS OF MANUFACTURE OF MULTIAXIALLY ORIENTED FLUOROPOLYMER FILMS

[75] Inventors: Donald Shannon, Mission Viejo; John McIntyre, Vista; Chris Kuo, Orange; Chris McCollam, Irvine; Robert Peterson, Dove Canyon, all of Calif.

[73] Assignee: Baxter International Inc., Deerfield, Ill.

[21] Appl. No.: 08/612,742

[22] Filed: Mar. 8, 1996

[51] Int. Cl.[7] ................................................. B29C 55/14
[52] U.S. Cl. ......................... 264/544; 264/127; 264/175; 264/210.2; 264/210.7; 264/292; 264/294; 264/573
[58] Field of Search ............................. 156/229; 264/127, 264/175, 210.2, 210.7, 235.8, 280, 290.2, 435, 436, 573, 292, 294, 544, 145; 425/366, 396

[56] References Cited

U.S. PATENT DOCUMENTS

| | | |
|---|---|---|
| 2,952,867 | 9/1960 | Diedrich et al. . |
| 4,153,661 | 5/1979 | Ree et al. ................................ 264/175 |
| 4,482,516 | 11/1984 | Bowman et al. . |
| 4,565,663 | 1/1986 | Errede et al. . |
| 4,820,787 | 4/1989 | Kataoka et al. . |
| 4,826,725 | 5/1989 | Harlow . |
| 4,985,296 | 1/1991 | Mortimer, Jr. . |
| 4,997,608 | 3/1991 | Haldeman et al. . |
| 5,006,292 | 4/1991 | Shii et al. . |
| 5,039,471 | 8/1991 | Yokota et al. ....................... 264/210.2 |
| 5,076,987 | 12/1991 | Wank et al. . |
| 5,098,625 | 3/1992 | Huang et al. . |
| 5,122,049 | 6/1992 | Baumgarter . |
| 5,167,890 | 12/1992 | Sasshofer et al. . |
| 5,207,960 | 5/1993 | Moret de Rocheprise . |
| 5,234,751 | 8/1993 | Harada et al. . |
| 5,288,552 | 2/1994 | Hollenbaugh, Jr. et al. . |
| 5,321,109 | 6/1994 | Bosse et al. . |
| 5,512,229 | 4/1996 | Bosse et al. ............................ 264/291 |

FOREIGN PATENT DOCUMENTS

| | | |
|---|---|---|
| 232543 | 8/1987 | European Pat. Off. . |
| 1104139 | 2/1968 | United Kingdom . |
| 2037294 | 7/1980 | United Kingdom . |
| WO 88/04982 | 7/1988 | WIPO . |

OTHER PUBLICATIONS

Modern Plastics Encyclopedia, 1983–84, pp. 24–26.

*Primary Examiner*—Jan H. Silbaugh
*Assistant Examiner*—Kenneth M. Jones
*Attorney, Agent, or Firm*—Baxter Healthcare; Peter Jon Gluck; Guy Cumberbatch

[57] ABSTRACT

Porous fluoropolymer films, such as PTFE films, formed by a method including the steps of (a) forming a fluoropolymer (e.g., PTFE) paste, (b) extruding, calendaring, or otherwise processing the paste to form a film extrudate, (c) causing the film extrudate to be calendared in a first directional axis, (d) subsequently calendaring the film extrudate in a second directional axis which is different from the first directional axis, (e) subsequently calendaring the film extrudate in at least one additional directional axis which is different from said first and second directional axes, thereby forming a multiaxially calendared film extrudate, (f) drying the multiaxially calendared film extrudate, and (g) radially expanding the multiaxially calendared film extrudate to form a radially oriented fluoropolymer (e.g., PTFE) film. The porous fluoropolymer films formed by this method are multiaxially oriented and exhibit isotropic strength properties.

20 Claims, 3 Drawing Sheets

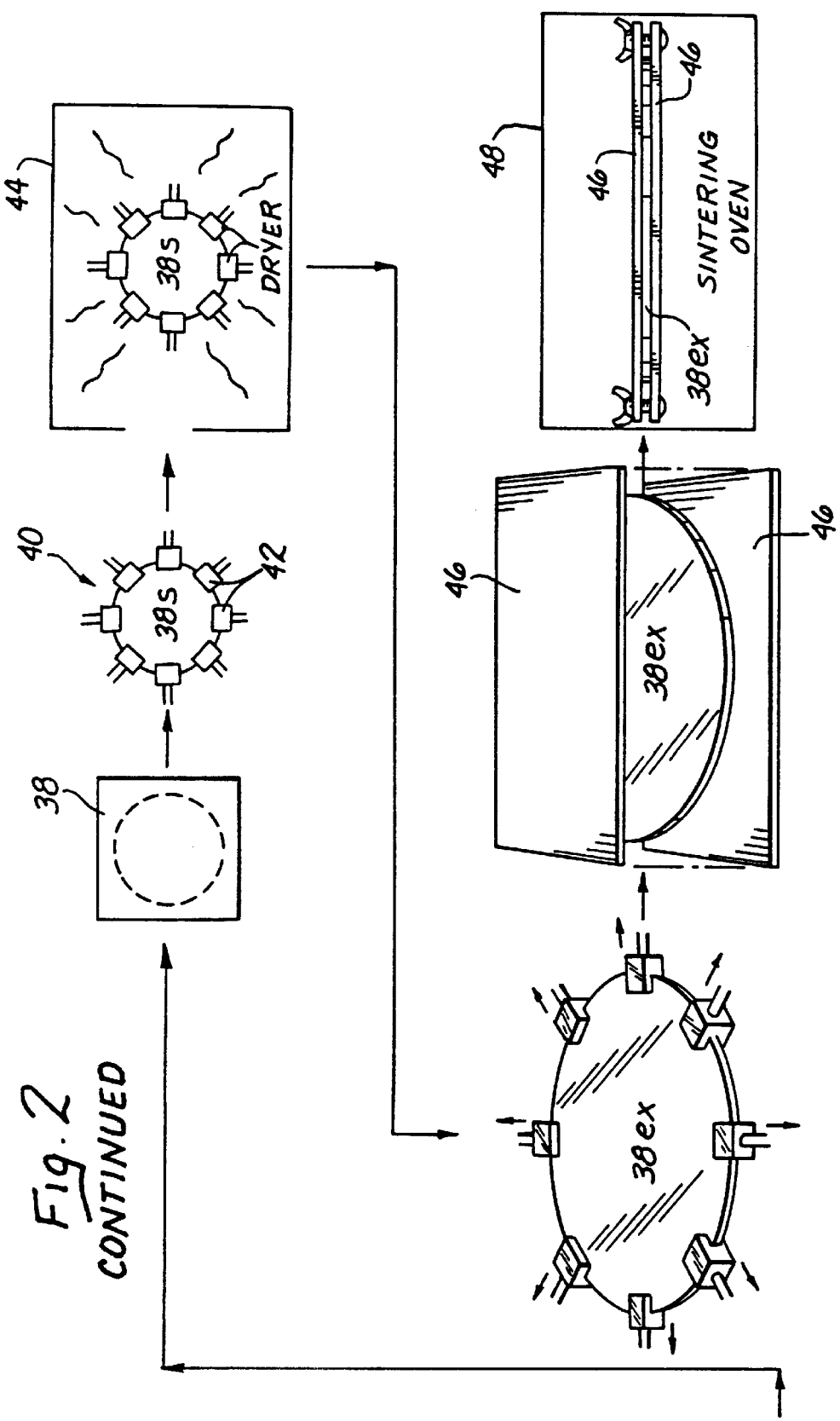

METHODS OF MANUFACTURE OF MULTIAXIALLY ORIENTED FLUOROPOLYMER FILMS

FIELD OF THE INVENTION

The present invention relates to porous fluoropolymer films, and more particularly to a multiaxially oriented, expanded, porous fluoropolymer film usable in biomedical patch graft applications.

BACKGROUND OF THE INVENTION

Porous fluoropolymer films have been used in a wide variety of applications, including biomedical applications wherein fluoropolymer film patch grafts are surgically anastomosed into an existing organ or tissue for surgical repair or reconfiguration thereof. Synthetic patch grafts of this type are typically used to repair various anatomical structures and organs, including blood vessels, heart, skin, soft tissue, pericardium, etc.

One fluoropolymer commonly used for the manufacture of porous films is polytetrafluoroethelyne (hereinafter "PTFE"). PTFE has excellent heat resistance, chemical resistance, self-lubricity, non-adhesiveness and biological compatibility. As a result of these desirable properties, PTFE porous films have found wide applicability in medical, industrial and other applications.

A basic method for manufacturing porous PTFE films is described in U.S. Pat. No. 4,478,665 (Gore). In accordance with this basic method, a PTFE paste is prepared by mixing crystalline PTFE fine powder with a quantity of liquid lubricant. The paste is subsequently extruded and calendared to form a wet, unsintered film extrudate. The film extrudate is cut into components. The components of PTFE containing a liquid lubricant are placed in intimate contact. The film extrudate is subsequently dried, expanded in at least one axis, and sintered. The sintering process is carried out by heating the PTFE to a temperature above its crystalline melting point (327° C.) but below the thermal degradation temperature thereof, for sufficient time to cause the PTFE polymer to substantially convert from its crystalline state to an amorphus state. In this regard, the sintering of PTFE is sometimes referred to as "amorphus locking" of the polymer.

Expanded, sintered PTFE films manufactured by the above-described basic process have a microstructure characterized by the existence of relatively dense areas known as "nodes" interconnected by elongate fibrils. The strength and porosity of the sintered PTFE film is largely a function of the directional orientation and spacing between the microstructural fibrils.

The directional orientation of the microstructural fibrils is determined by the directional axis or axes in which the film is a) calendared and b) expanded, prior to sintering thereof. Sintered PTFE films which have been calendared and expanded uniaxially typically have high strength only in the direction of the axis in which the film was calendared and expanded. Similarly, PTFE films which have been biaxially calendared and expanded may subsequently have high strength in both axes in which the film was previously calendared and expanded.

It is desirable to develop methods for manufacturing multiaxially calendared and expanded films which will exhibit substantially isotropic strength properties in all directions. Such multiaxially oriented films may exhibit highly uniform strength properties in all directions, thereby providing superior films for use in applications, such as biomedical patch graft applications, wherein multiaxial orientation and isotropic strength properties are desirable.

Prior efforts to manufacture multi axially oriented PTFE films have been described. For example, U.S. Pat. No. 4,478,655 (Hubis) purports to describe a method for producing a composite or "multicomponent" porous PTFE film wherein a plurality of individual uniaxially oriented films are placed in juxtaposition, in varying orientations, and subsequently fused or laminated to one another to produce a composite article which exhibits composite multi axial orientation and isotropic strength properties.

There remains a need in the art for the development of new and/or improved methods for manufacturing thin, porous fluoropolymer films having multi axial fibril orientation and resultant isotropic strength properties after sintering.

SUMMARY OF THE INVENTION

The present invention is a method of manufacturing expanded, porous, sintered, multi-axially oriented fluoropolymer film, said method comprising the steps of (a) forming a fluoropolymer (e.g., PTFE) paste, (b) extruding or otherwise processing the paste to form a film extrudate, (c) causing the film extrudate to be calendared in a first directional axis, (d) subsequently calendaring the film extrudate in a second directional axis which is different from the first directional axis, (e) subsequently calendaring the film extrudate in at least one additional directional axis which is different from said first and second directional axes, thereby forming a multiaxially calendared film extrudate, (f) drying the multiaxially calendared film extrudate, and (g) radially expanding the multiaxially calendared film extrudate to form a radially oriented fluoropolymer (e.g., PTFE) film.

Further in accordance with the invention, the repetitive calendaring steps (i.e., steps (c)–(e)) of the method may be accomplished using a single calendaring machine, or a series of separate calendaring machines, and the differing directional orientation of the workpiece may be accomplished by rotating or otherwise reorientating the film extrudate prior to each passage through the calendaring machine(s).

Still further in accordance with the invention, the drying of the multiaxially calendared film extrudate (i.e., step (f)) may be accomplished by heating the film extrudate to a temperature which is below the melting point of the fluoropolymer, but which is sufficiently high to cause evaporation of substantially all liquid lubricant contained in the film extrudate.

Still further in accordance with the invention, the step of radially expanding the multiaxially calendared film extrudate (i.e., step (g)) may be accomplished by any suitable radial expansion device or apparatus, including a panograft apparatus of the type described in U.S. Pat. No. 3,953,566 (Gore).

Further objects and aspects of the invention may be apparent to those skilled in the art upon reading and understanding of the following detailed descriptions of the preferred embodiments, and upon consideration of the accompanying drawings.

DETAILED DESCRIPTION OF THE PREFERRED EMBODIMENTS

The following detailed description and the accompanying drawings are provided for purposes of describing and illustrating presently preferred embodiments and examples of the invention only, and are not intended to limit the scope of the invention in any way.

i. The Fluoropolymer Film Preparation Method of the Present Invention

Figure 1:
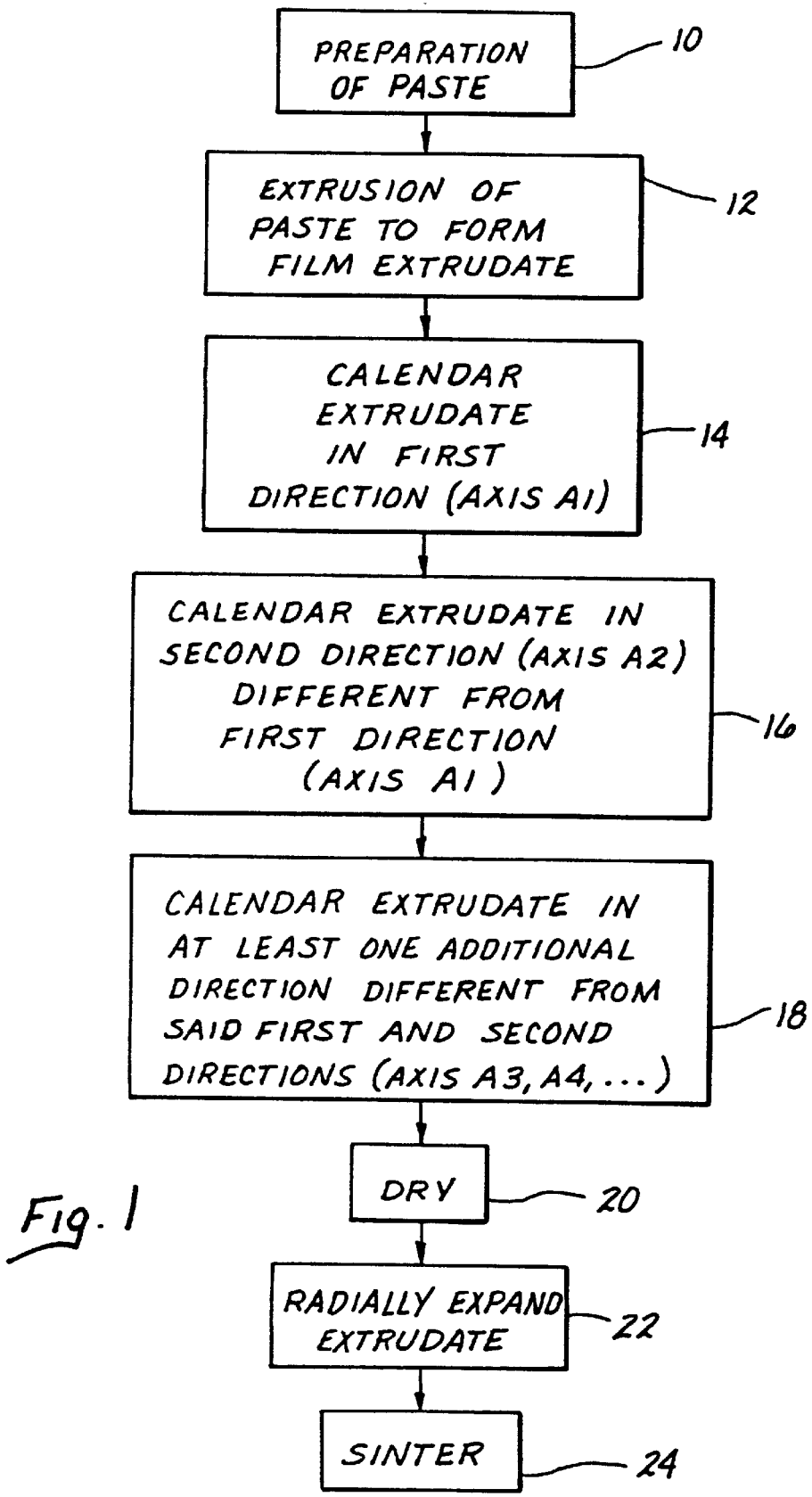
FIG. 1 is a block diagram showing a preferred method for manufacturing a multi axially oriented expanded fluoropolymer (e.g., PTFE) film in accordance with the present invention.

FIG. 1 shows a block diagram of the basic method of the present invention. The following paragraphs describe the individual steps of the basic method set forth in the block diagram of FIG. 1.

Step A: Preparation of PTFE Paste

The initial step of the method is the preparation of an extrudable fluoropolymer paste 10.

Step B: Extrusion of Film

The fluoropolymer paste dispersion prepared in step 10 is subsequently extruded 12 to form a wet film extrudate. This is typically accomplished by passing the fluoropolymer paste dispersion through an extrusion machine at temperatures in the range of 18–50° C. to form a wet film extrudate.

Step C: First Calendaring of Unsintered Film (Axis $A_1$)

The wet film extrudate is subjected to an initial calendaring step 14 wherein the extrudate is passed through at least one set of opposing stainless steel calendaring rollers which have an adjustable gap thickness therebetween. The gap thickness between the calendaring rollers is adjusted to decrease the thickness of the wet film extrudate as it passes between the calendaring rollers. Typically, the width of the unsintered film extrudate is maintained constant but the length thereof is allowed to increase as the thickness thereof decreases.

One example of a commercially available calendaring machine useable for this step of the method is the small Killion two-roll stack (Killion Extruders, Inc., Ceder Grove, N.J. 07009).

Step D: Second Calendaring in Second Direction (Axis $A_2$)

The unsintered film extrudate is subsequently subjected to a second calendaring step 16 wherein the film is calendared in a second direction (Axis $A_2$) which differs from the first direction (Axis $A_1$) in which the film was calendared during the initial calendaring step 14.

The completion of this second calendaring step 16 accomplishes biaxial orientation of the pre fibrillar regions of the film microstructure (i.e., the areas or regions which form the internodal fibrils upon expansion of the film) in the directions of axes $A_1$ & $A_2$.

This second calendaring step 16 may be carried out using the same type of calendaring device described hereabove with respect to the first calendaring step 14.

Step E: Third and Subsequent Calendaring (Axes $A_3 \ldots A_n$)

Following the second calendaring step 16, the unsintered film extrudate is subjected to at least one additional calendaring step 18 to cause the film to be further calendared in the direction of at least one additional axis ($A_3, A_4, A_5 \ldots$). The additional axis ($A_3$) or axes ($A_3, A_4, \ldots$) of prefibrilar orientation induced by this additional calendaring step(s) 18 differ(s) from the first and second axes $A_1$, $A_2$ of prefibrilar orientation induced during the first and second calendaring steps 14, 16. This results in a multiaxially oriented film extrudate.

This subsequent calendaring step(s) 18 may be carried out using the same type of calendaring device described hereabove with respect to the first and second calendaring steps 14, 16.

Step F: Drying of the Expanded Film Extrudate

The film extrudate is subjected to a drying step 20 wherein the liquid lubricant is removed from the film, thereby providing a dry film. This drying step 20 may be accomplished by heating the film in an oven or other suitable heating device to a temperature in the range of 100–300° C. so as to cause rapid evaporation of the liquid lubricant from the matrix of the film. This drying step may be accomplished while the film remains clamped in a panograft device used to effect a subsequent radial expansion step 22 as described herebelow, or may be carried out with or without any other type of clamping or restraint on the film.

Step G: Radial Expansion of MultiAxially Calendared Extrudate

After completion of the drying step 20, the unsintered film extrudate is radially expanded 22.

This radial expansion step 22 may be carried out by affixing the multiaxially calendared film extrudate in a panograft device at 300° C. of the type described in U.S. Pat. No. 3,953,566 (Gore), and using such device to radially expand the film extrudate, preferably by an expansion ratio of 2:1–5:1.

Alternatively, this radial expansion step 22 may be carried out by blown extrusion technology whereby air or other gas is blown or forced against one side of the unsintered film extrudate while the periphery thereof is clamped or otherwise held in stationary position, thereby causing the desired radial expansion step 22.

Alternatively, this radial expansion step 22 may be carried out by clamping or otherwise holding the periphery of the film extrudate in a stationary position while advancing a pusher apparatus, such as an elongate rod having a rounded or blunt end, against the midregion of the film extrudate, thereby causing the desired radial expansion step 22 to be accomplished.

Step H: Sintering of the Radially Expanded Film Extrudate

Following drying and radial expansion of the film, the film is subjected to a sintering step 24. In this sintering step 24, the film is preferably restrained or compressed between two flat surfaces while being heated to a temperature above the melting point of the crystalline fluoropolymer but below the thermal degradation temperature thereof. Such heating and restraint of the film is maintained for a sufficient period of time to cause substantially complete sintering of the fluoropolymer.

By the above-described steps, the basic method of the present invention results in the formation of a multiaxially oriented, radially expanded fluoropolymer film having a preferred density of 0.3–1.0 g/cm$^3$, and generally isotropic strength properties.

ii. Preparation of a Preferred Radially Stretchable PTFE Film by the Method of the Present Invention FIG. 2 is a step-wise illustration of an example whereby a radially oriented, PTFE film is manufactured by the method described hereabove and generally shown in the block diagram of FIG. 1.

Figure 2:
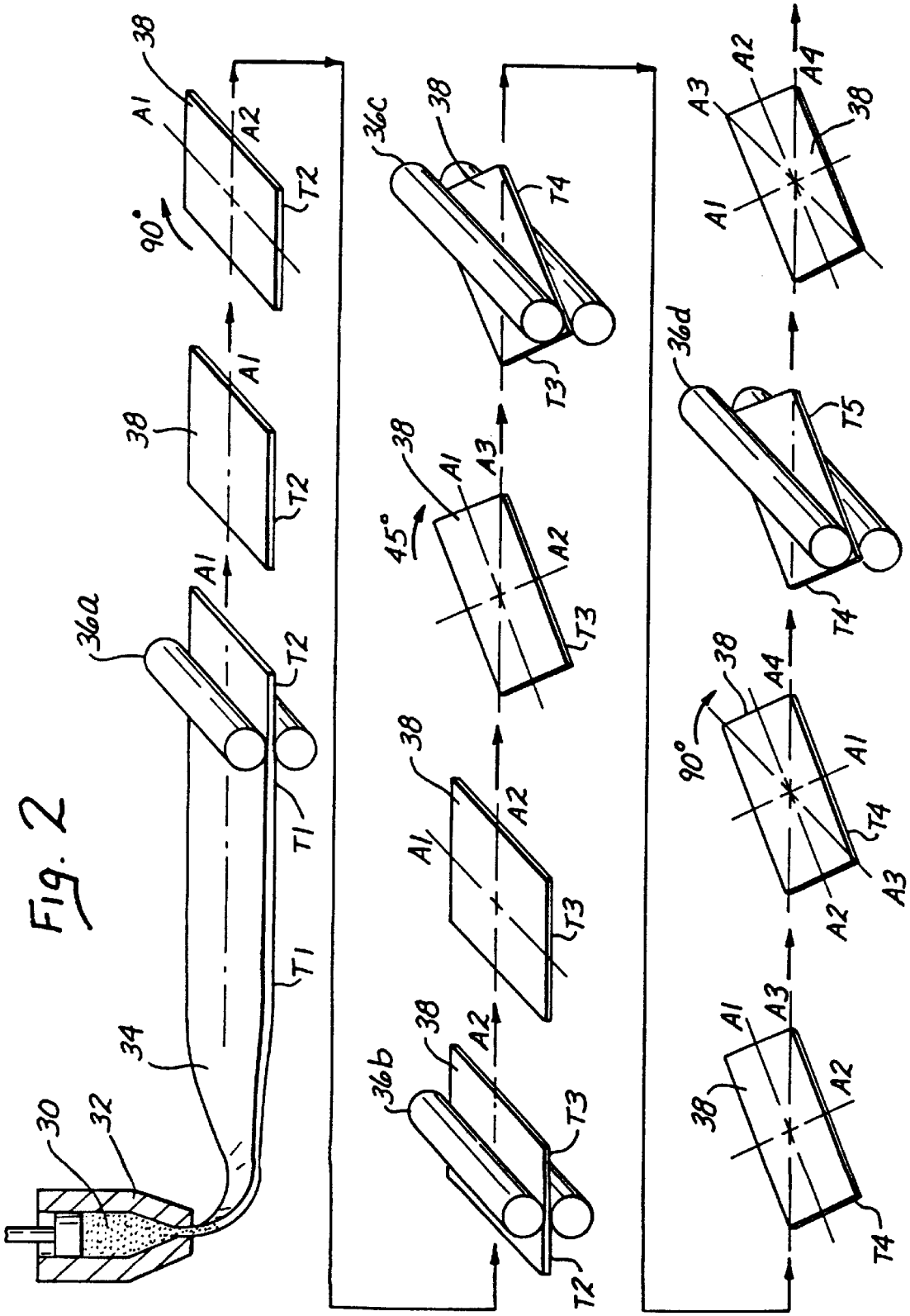
FIG. 2 is a schematic diagram of one exemplary method for manufacturing multi axially oriented fluoropolymer film in accordance with the present invention.

With reference to FIG. 2, a quantity of PTFE paste 30 is prepared by blending unsintered PTFE fine powder having a crystallinity in excess of 90% (e.g., F103 or F104 Virgin PTFE Fine Powder, Dakin America, 20 Olympic Drive, Orangebury, N.Y., 10962) with a quantity of liquid lubricant such as odorless mineral spirits (e.g., Isopar®, Exxon Chemical Company, Houston, Tex. 77253-3272) at a lubricant/powder weight ratio typically of about 25%. This PTFE paste 30 is of extrudable consistency and is passed through an extrusion die 32 to form an elongate extrudate 34. The extrudate 34 has a thickness $T_1$. The extrudate 34 is passed through a first calendaring device 36a (e.g., a small Killion Two Roll Stack, Killion Extruders, Inc., Cedar Grove, N.J. 07009), and is thereby calendared to form a film 38 having an initial thickness $T_2$. The extrudate 32 is initially passed through the first calendaring device 36a in the longitudinal direction of first axis $A_1$.

The film 38 of initial thickness $T_2$ is cut into a segment, such as a rectangle or square. The cut segment of film 38 is then rotated 90° and passed through a second calendaring device 36b in the direction of second axis $A_2$ perpendicular to the first axis $A_1$. As it passes through the second calendaring device 36b, the film 38 is calendared from its initial thickness $T_2$ to a decreased thickness $T_3$. Also, passage through the second calendaring device 36b results in biaxial orientation of the pre-fibrillar regions of the film 38. The width of the film 38 is maintained constant as it passes through the second calendaring device 36b, and the length of the film 38a is allowed to increase as the thickness decreases from $T_2$ to $T_3$. Thus, at this point in the process, the segment of film 38 has been calendared biaxially, in the directions of two perpendicular axes $A_1$ and $A_2$.

Thereafter, the segment of film 38 of thickness $T_3$ is rotated 45° and is passed through a third calendaring device 36c in the direction of third axis $A_3$. Third axis $A_3$ is, in the example shown, disposed at a 45° angle relative to axes $A_1$ and $A_2$, thereby accomplishing triaxial calendaring of the segment of film 38. As it passes through the third calendaring device 36c, the thickness of the segment of film 38 decreases from $T_3$ to $T_4$. Also, passage through the third calendaring device 36c results in triaxial orientation of the prefibrilar regions of the film 38. The width of the segment of film 38 is maintained constant as it passes through the third calendaring device 36c and the length thereof is permitted to increase as the thickness decreases from $T_3$ to $T_4$.

Thereafter, the segment of film 38 is again rotated 90° and passed, in the direction of a fourth longitudinal axis $A_4$, through a fourth calendaring device 36d. As it passes through the fourth calendaring device 36d the segment of film 38 decreases in thickness from $T_4$ to $T_5$. The width of the segment of film 38 is maintained constant as it passes through the fourth calendaring device 36d and the length thereof is permitted to increase as the thickness of the segment of film 38 decreases from $T_4$ to $T_5$.

In the example shown, the fourth axis $A_4$ is at 90° to the third axis $A_3$, and at 45° to each of the first two axes $A_1$ and $A_2$. In this regard, after emerging from the fourth calendaring device 36d, the segment of film 38 has been quatriaxially calendared in the directions of four axes $A_1$–$A_4$. This results in corresponding quatriaxial orientation of the pre-fibrillar regions of the film 38.

Thereafter, the segment of film 38 is positioned on a flat surface and a circular center portion 38s is cut therefrom. The circular center portion 38s of the segment of film 38 is then affixed or clamped within a radial expansion device or panograft 40. Such radial expansion device or panograft 40 comprises a plurality of individual clamps 42 arranged in a circular configuration. The clamps 42 are connectable to the peripheral edge of the circular center portion 38s of the segment of film 38, as shown. Thereafter, while the film segment 38s remains clamped in the panograft device 40, but prior to any radial expansion thereof, the film segment 38s and panograft device 40 are positioned within drying device 44, such as the oven, wherein the temperature of the film is elevated to 100–300° C. for a sufficient period of time to cause evaporation of the liquid lubricant therefrom.

The individual clamps 42 of the panograft device 40 are then concurrently moveable in outward, radially divergent directions while the temperature of the film segment 38s is maintained at approximately 300° C. so as to exert a radial expansion force on the circular portion 38s of film. This results in radial expansion of the circular portion 38s of film to form expanded film segment 38ex, as shown. The preferred ratio of radial expansion is in the range of 2:1 to 5:1. The radial expansion of the film 38, in conjunction with the preceding multiaxial calendaring thereof, results in multiaxial (i.e., radial) fibril orientation within the expanded film. One example of a radial expansion device or panograft 40 useable to effect this step of the process is that described in U.S. Pat. No. 3,953,566 (Gore).

The dried, expanded film segment 38ex is then removed from the panograft device 40 and is subsequently compressed between two flat platens 46, as shown. The flat platens 46, along with the dried expanded film segment 38ex positioned therebetween, are then placed in a sintering device 48, such as an oven, and heated to a temperature above the crystalline melting point of PTFE (>327° C.) but below the thermal degradation temperature of PTFE (e.g., <400° C.) for a sufficient period of time to effect sintering of the PTFE.

Thereafter the sintered, expanded film segment 38ex is removed from between the platens 46 and is allowed to cool to room temperature.

The resultant expanded, sintered PTFE film segment 38ex has multiaxially oriented fibrils.

Those skilled in the art of manufacturing fluoropolymer films will appreciate that the foregoing detailed description may be subject to various additions, changes, deletions and/or alterations without departing from the intended spirit and scope of the invention. It is intended that all such additions, changes, deletions and/or alterations be included within the scope of the following claims.

What is claimed is:

1. A method of manufacturing multi-axially oriented fluoropolymer films, the method comprising:

providing a fluoropolymer film extrudate having a first thickness, first and second orthogonal axes being defined in the plane of the film extrudate;

calendaring the film extrudate in a first direction parallel to the first orthogonal axis between two parallel rollers spaced apart by a first gap smaller than the first thickness to reduce the film extrudate to a second thickness;

forming the film extrudate calendaring in the first direction into a segment having a square or rectangular configuration, each of the first and second orthogonal axes being respectively parallel to one of the pairs of opposed sides;

calendaring the film extrudate having the second thickness in a second direction with respect to the orthogonal axes different than the first direction between two parallel rollers spaced apart by a second gap smaller than the second thickness to reduce the film extrudate to a third thickness;

maintaining the width of the film extrudate constant as it passes through the parallel rollers in the second direction, thereby causing the film extrudate to increase in length; and drying, expanding, and sintering the film exudate.

2. The method of claim 1, wherein the second direction is parallel to the second orthogonal axis.

3. The method of claim 2, further including:

calendaring the film extrudate having the third thickness in a third direction with respect to the orthogonal axes different the either the first or second directions between two parallel rollers spaced apart by a third gap smaller than the third thickness to reduce the film extrudate to a fourth thickness.

4. The method of claim 3, wherein the third direction is oriented approximately 45 degrees with respect to the first orthogonal axis.

5. The method of claim 3, further including:

calendaring the film extrudate having the fourth thickness in a fourth direction with respect to the orthogonal axes different the either the first, second or third directions between two parallel rollers spaced apart by a fourth gap smaller than the fourth thickness to reduce the film extrudate to a fifth thickness.

6. The method of claim 5, wherein the fourth direction is oriented approximately 45 degrees with respect to the first orthogonal axis.

7. The method of claim 6, wherein the fourth direction is oriented approximately 90 degrees with respect to the third direction.

8. The method of claim 1, wherein the step of providing includes providing a fluoropolymer paste and extruding the fluoropolymer paste into the film extrudate.

9. The method claim 8, wherein the steps of extruding the fluoropolymer paste and calendaring the film extrudate in the first direction are combined, thereby simultaneously forming the fluoropolymer paste into a film extrudate and initially calendaring the film extrudate in the first direction.

10. The method of claim 1, further including forming the film extrudate after the first calendaring step into a segment having a square or rectangular configuration, each of the first and second orthogonal axes being respectively parallel to one of the pairs of opposed sides.

11. The method of claim 1, further including maintaining the width of the film extrudate constant during all of the calendaring steps, thereby causing the film extrudate to increase in length during each calendaring step.

12. The method of claim 1 wherein the step of expanding comprises:

cutting a substantially round segment of the multiaxially calendared film extrudate, the substantially round segment having a substantially round peripheral edge;

attaching a plurality of clamping apparatus about the peripheral edge of the substantially round segment of film extrudate; and causing the clamping apparatus to concurrently move in radially outward directions to thereby effect radial expansion of the substantially round segment of film extrudate.

13. The method of claim 12 wherein the clamping apparatus are incorporated into a panograft device.

14. The method of claim 12 wherein the radial expansion is carried out at an expansion ratio in the range of 2:1–10:1.

15. The method of claim 1 wherein the step of expanding comprises:

radially expanding the multiaxially calendared film extrudate by blown extrusion whereby pressurized gas is blown against the film extrudate to cause radial expansion thereof.

16. The method of claim 1 wherein the multiaxially calendared film extrudate has a middle region and a periphery, and wherein the step of expanding comprises:

advancing a blunt-ended pusher device against the midregion of the multiaxially calendared film extrudate while holding the periphery thereof in stationary position, thereby causing radial expansion of the multiaxially calendared film exudate.

17. The method of claim 1 wherein the step of sintering comprises:

heating the radially expanded fluoropolymer film to a temperature above the crystalline melting point of the fluoropolymer but below the thermal degradation temperature of the fluoropolymer for a sufficient period of time to cause sintering of the fluoropolymer.

18. The method of claim 1 wherein the fluoropolymer is PTFE and wherein the step of sintering comprises heating the PTFE film to a temperature between 327° C. and 400° C. for a sufficient period of time to cause sintering of the PTFE.

19. A method of manufacturing multi-axially oriented fluoropolymer films, the method comprising:

providing a fluoropolymer film extrudate having a first thickness, first and second orthogonal axes being defined in the plane of the film extrudate;

calendaring the film extrudate in a first direction parallel to the first orthogonal axis between two parallel rollers spaced apart by a first gap smaller than the first thickness to reduce the film extrudate to a second thickness;

calendaring the film extrudate having the second thickness in a second direction with respect to the orthogonal axes different than the first direction between two parallel rollers spaced apart by a second gap smaller than the second thickness to reduce few film extrudate to a third thickness; and drying, expanding, and sintering the film extrudate, wherein the step of expanding comprises radially expanding the multiaxially calendared film extrudate by blown extrusion whereby pressurized gas is blown against the film extrudate to cause radial expansion thereof.

20. A method of manufacturing multi-axially oriented fluoropolymer films, the method comprising:

providing a fluoropolymer film extrudate having a first thickness, first and second orthogonal axes being defined in the plane of the film extrudate;

calendaring the film extrudate in a first direction parallel to the first orthogonal axis between two parallel rollers spaced apart by a first gap smaller than the first thickness to reduce the film extrudate to a second thickness;

calendaring the film extrudate having the second thickness in a second direction with respect to the orthogonal axes different than the first direction between two parallel rollers spaced apart by a second gap smaller than the second thickness to reduce the film extrudate to a third thickness; and drying, expanding, and sintering the film extrudate, wherein the multiaxially calendared film extrudate has a middle region and a periphery, and wherein the step of expanding comprises:

advancing a blunt-ended pusher device against the midregion of the multiaxially calendared film extrudate while holding the periphery thereof in stationary position, thereby causing radial expansion of the multiaxially calendared film extrudate.

* * * * *